(12) United States Patent
Nagano

(10) Patent No.: US 7,721,938 B2
(45) Date of Patent: May 25, 2010

(54) FRICTION STIRRING-JOINING METHOD AND METHOD OF MANUFACTURING HOLLOW BODY

(75) Inventor: Yoshitaka Nagano, Oyama (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 12/063,243

(22) PCT Filed: Aug. 11, 2006

(86) PCT No.: PCT/JP2006/315908

§ 371 (c)(1),
(2), (4) Date: Feb. 8, 2008

(87) PCT Pub. No.: WO2007/020883

PCT Pub. Date: Feb. 22, 2007

(65) Prior Publication Data

US 2009/0108050 A1 Apr. 30, 2009

(30) Foreign Application Priority Data

Aug. 12, 2005 (JP) .............................. 2005-234022

(51) Int. Cl.
*B23K 20/12* (2006.01)

(52) U.S. Cl. .................................. 228/112.1; 212/44.3

(58) Field of Classification Search ................... 228/2.1, 228/112.1, 44.3–44.7, 47.1–49.6, 212; 156/73.5
See application file for complete search history.

(56) References Cited

U.S. PATENT DOCUMENTS

| 4,650,954 A | * | 3/1987 | Frings et al. ............ 219/121.64 |
| 2005/0045694 A1 | * | 3/2005 | Subramanian et al. ... 228/112.1 |

FOREIGN PATENT DOCUMENTS

| JP | 11 291067 | 10/1999 |
| JP | 2002 283070 | 10/2002 |
| JP | 2004-148350 | 5/2004 |

* cited by examiner

*Primary Examiner*—Jessica L. Ward
*Assistant Examiner*—Kevin E Yoon
(74) *Attorney, Agent, or Firm*—Oblon, Spivak, McClelland, Maier & Neustadt, L.L.P.

(57) ABSTRACT

A friction stir welding method in which a base having a recess, and a cover for fitting into and closing the opening of the recess are prepared. A stepped portion on the inner circumferential surface of the recess at an intermediate depth allows a peripheral portion of the cover to rest thereon. A cylindrical holder portion having a cooling-medium accommodation recess is formed integrally with the outer surface of the cover. The cover is fitted into the recess and placed on the stepped portion. A cooling medium is placed in the cooling-medium accommodation recess. A friction-stir-welding tool probe is plunged into a peripheral portion of the base around an opening of the recess and into a peripheral portion of the cover. During rotation of the probe, the base, and the cover, and the probe undergo relative movement, friction-stir-welding the base and the cover together.

3 Claims, 3 Drawing Sheets

FRICTION STIRRING-JOINING METHOD AND METHOD OF MANUFACTURING HOLLOW BODY

TECHNICAL FIELD

The present invention relates to a friction stir welding method for manufacturing metal products to be utilized in various industries, as well as to a method of manufacturing a hollow body.

BACKGROUND ART

The friction stir welding method is a solid-phase joining method, and thus has an advantage that deformation or cracking caused by thermal strain is less likely to arise as compared with an arc welding process, such as TIG or MIG. Also, when the arc welding process is employed for joining workpieces of a light metal, such as aluminum, in such a manner as to have a weld penetration depth of 5 mm or greater, multi-layer welding is required. Thus, the number of steps increases. Also, due to occurrence of a blowhole defect or hot cracking, there arises a problem of deterioration in joining quality. Meanwhile, even in the case of a weld penetration depth of 5 mm or greater, an electron beam welding process can achieve joining by a single pass. However, since electron beam welding must be carried out within a vacuum, apparatus cost increases. Furthermore, since the beam diameter is small, the dimensional accuracy of beveling and positioning accuracy must be enhanced. Thus, associated setup work is rather troublesome. By contrast, in joining with a joint depth of up to about 25 mm, the friction stir welding method can readily achieve joining by a single pass without involvement of the above-mentioned defects involved in arc welding. Also, since consumables, such as filler metal and shield gas, are not used, implementation cost is low.

However, even in the friction stir welding method, in the case of a long joint, a deep joint, workpieces having high deformation resistance, etc., the amount of frictional heat generated during joining is significantly large. Accordingly, in the case of time-consuming joining, joining of workpieces having high deformation resistance, joining of workpieces having a shape susceptible to accumulation of heat, etc., a temperature difference becomes large between a joining start zone and a joining end zone, thereby raising a problem of great variation in joining quality along the longitudinal direction of the joint portion.

A proposed friction stir welding method which has solved the above problems employs cooling means which are disposed on opposite sides of a friction-stir-welding tool and which move synchronously with the friction-stir-welding tool (refer to Patent Document 1). In friction stir welding, during movement of a probe of the friction-stir-welding tool and the cooling means, the cooling means spray a cooling medium over a leading zone and a trailing zone with respect to the direction of movement of the probe, and a control unit controls a spraying rate.

However, according to the method disclosed in Patent Document 1, the cooling means must be moved synchronously with the friction-stir-welding tool, and the spraying rate of the cooling medium from the cooling means must be controlled by the control unit, thus involving a problem of an increase in cost of apparatus for carrying out the method. Also, since the cooling medium is sprayed over a leading zone with respect to the direction of movement of the probe, the cooling medium may penetrate into an unjoined interface between workpieces, and, in this condition, joining may be carried out. Therefore, joining quality may deteriorate. Patent Document 1: Japanese Patent Application Laid-Open (kokai) No. 2004-148350

DISCLOSURE OF THE INVENTION

Problems To Be Solved By the Invention

An object of the present invention is to solve the above problems and to provide a friction stir welding method which can be carried out at lower cost as compared with the method disclosed in Patent Document 1, as well as to provide a method of manufacturing a hollow body.

Means For Solving the Problems

To fulfill the above object, the present invention comprises the following modes.

1) A friction stir welding method in which a probe of a friction-stir-welding tool is plunged into a prospective joint region of two workpieces of metal, and, while the probe is rotated, the probe and the two workpieces are caused to undergo relative movement so as to move the probe along the prospective joint region of the two workpieces, thereby friction-stir-welding the two workpieces together, the method being characterized in that a cooling medium for removing latent heat during friction stir welding is held on a surface of at least one of the two workpieces on a side from which the probe is plunged, and, in the thus-prepared condition, the two workpieces are friction-stir-welded together.

2) A friction stir welding method according to par. 1), wherein the cooling medium is held on a surface of each of the two workpieces on opposite sides with respect to the prospective joint region.

3) A friction stir welding method according to par. 1), wherein the two workpieces differ in thermal capacity, and the cooling medium is held on a surface of at least the workpiece having a smaller thermal capacity.

4) A friction stir welding method according to par. 1), wherein the two workpieces differ in high-temperature deformation resistance, and the cooling medium is held on a surface of at least the workpiece having a higher high-temperature deformation resistance.

5) A friction stir welding method according to par. 1), wherein a holder portion having a cooling-medium accommodation recess is formed integrally with the surface of the workpiece on which the cooling medium is to be held.

6) A friction stir welding method according to par. 1), wherein a clamp member for clamping the workpiece on which the cooling medium is to be held has a holder portion having a cooling-medium accommodation recess.

7) A method of manufacturing a hollow body in which a base having a recess, and a cover to be fitted into the recess and to close an opening of the recess are prepared, a stepped portion is formed on an inner peripheral surface of the recess at an intermediate depth for allowing a peripheral portion of the cover to rest thereon, the cover is fitted into the recess and placed on the stepped portion of the recess, and, subsequently, a probe of a friction-stir-welding tool is plunged from outside into a peripheral portion of the base around the opening of the recess and into a peripheral portion of the cover, and, then, while the probe is rotated, the base and the cover, and the probe are caused to undergo relative movement so as to move the probe along the entire perimeter of the peripheral portion around the opening of the recess and along the entire perimeter of the peripheral portion of the cover, thereby friction-stir-welding the base and the cover together, the method being characterized in that a cooling medium for removing latent heat during friction stir welding is held on an outer surface of the cover, and, in the thus-prepared condition, the base and the cover are friction-stir-welded together.

8) A method of manufacturing a hollow body according to par. 7), wherein a holder portion having a cooling-medium accommodation recess is formed integrally with the outer surface of the cover.

9) A method of manufacturing a hollow body according to par. 7), wherein a clamp member for clamping the cover has a holder portion having a cooling-medium accommodation recess.

Effects of the Invention

According to the method of any one of pars. 1) to 4), frictional heat generated during joining is removed as latent heat by the cooling medium which is held in place. Thus, in the case of time-consuming joining, joining of workpieces having high deformation resistance, joining of workpieces having a shape susceptible to accumulation of heat, etc., there can be restrained occurrence of a large temperature difference between a joining start zone and a joining end zone and occurrence of great variation in joining quality along the longitudinal direction of the joint portion. Also, since a significant temperature rise in the joining end zone is restrained, occurrence of defect in the joining end zone is prevented. Therefore, the entire joint can exhibit a predetermined joining strength, and appearance of a weld bead is consistent. Furthermore, merely holding the cooling medium along the overall length of a prospective joint region suffices, thereby eliminating need to employ the means for moving the cooling means and the control unit which are employed in the method disclosed in Patent Document 1, and thus lowering implementation cost. Additionally, since penetration of the cooling medium into an unjoined interface between workpieces is prevented, a deterioration in joining quality is restrained.

The method of par. 3) yields the following effects. In the case of a workpiece having a small thermal capacity, frictional-heat input causes a significant temperature rise. Thus, a temperature difference becomes significantly large between a joining start zone and a joining end zone; accordingly, a great variation arises in joining quality along the longitudinal direction of the joint portion, and a defect is apt to arise in the joining end zone, where temperature rises greatly. However, occurrence of these problems is prevented by means of holding the cooling medium on a surface of the workpiece having a smaller thermal capacity.

The method of par. 4) yields the following effects. In the case of a workpiece having a high high-temperature deformation resistance, the quantity of frictional heat generated during joining is large, causing a significant temperature rise. Thus, a temperature difference becomes significantly large between a joining start zone and a joining end zone; accordingly, a great variation arises in joining quality along the longitudinal direction of the joint portion, and a defect is apt to arise in the joining end zone, where temperature rises greatly. However, occurrence of these problems is prevented by means of holding the cooling medium on a surface of the workpiece having a high high-temperature deformation resistance.

The method of par. 5) allows the cooling medium to be held on a workpiece in a relatively easy manner.

The method of par. 6) eliminates a need to form the holder portion for every workpiece and enables application to a large number of workpieces.

According to the method of par. 7), frictional heat generated during joining is removed as latent heat by the cooling medium held on the cover. Thus, in the case of time-consuming joining, joining of a base and a cover which are made of a material having a high deformation resistance, etc., there can be restrained occurrence of a large temperature difference between a joining start zone and a joining end zone and occurrence of great variation in joining quality along the longitudinal direction of the joint portion. Also, since a significant temperature rise in the joining end zone is restrained, occurrence of defect in the joining end zone is prevented. Therefore, in a manufactured hollow body, the entire joint portion between the cover and the base can exhibit a predetermined joining strength, and appearance of a weld bead is consistent. Furthermore, merely holding the cooling medium on the cover suffices, thereby eliminating need to employ the means for moving the cooling means and the control unit which are employed in the method disclosed in Patent Document 1, and thus lowering implementation cost. Additionally, since penetration of the cooling medium into an unjoined interface between the cover and the base is prevented, a deterioration in joining quality is restrained.

The method of par. 8) allows the cooling medium to be held on the cover in a relatively easy manner.

The method of par. 9) eliminates a need to form the holder portion for every cover, which partially constitutes a corresponding hollow body.

BEST MODE FOR CARRYING OUT THE INVENTION

Figure 1:
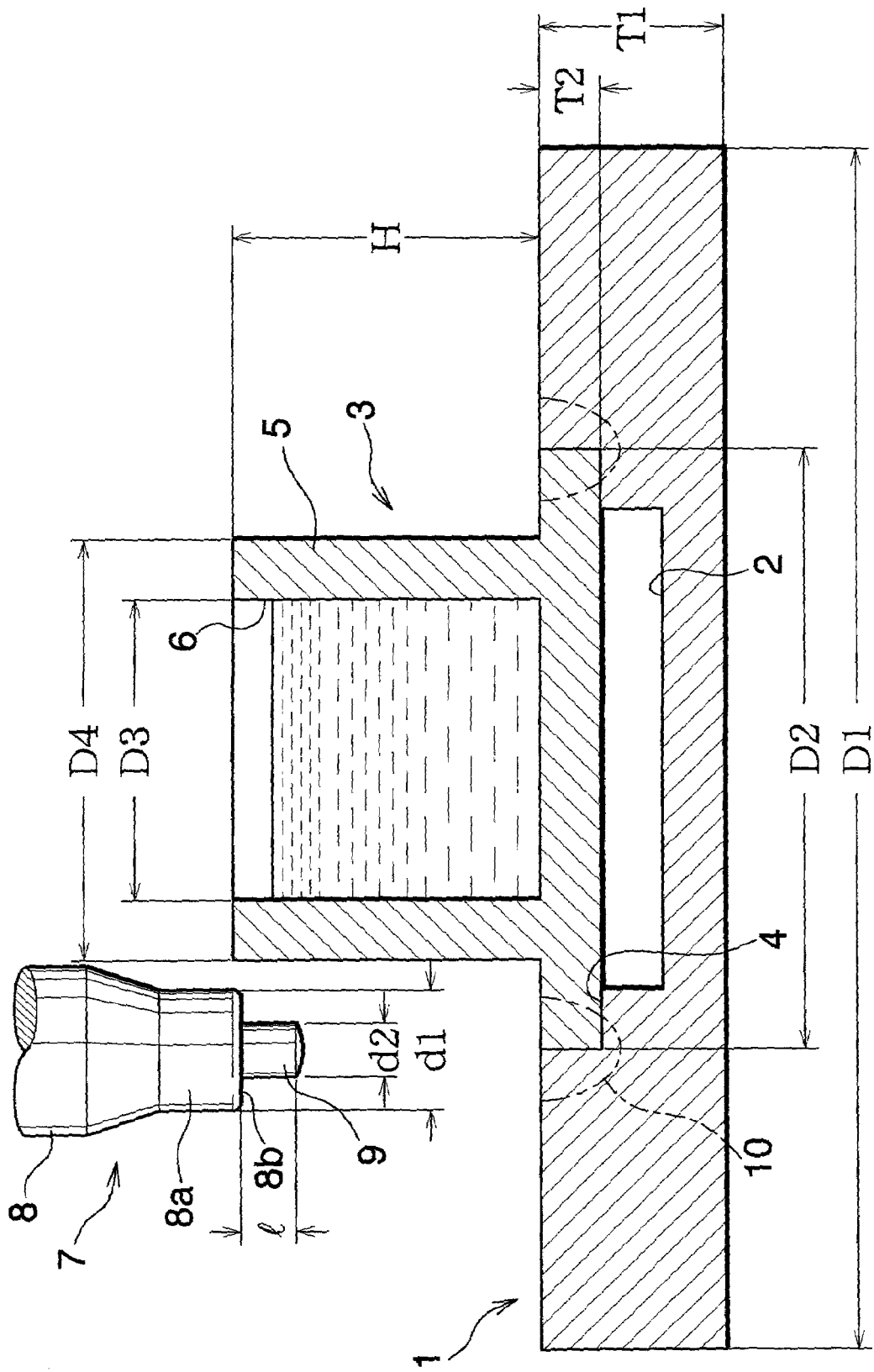
FIG. 1 is a vertical sectional view showing a part of a process in a method of manufacturing a hollow body according to Embodiment 1 of the present invention.

Embodiments of the present invention will next be described in detail with reference to the drawings. In the drawings, like sections or components throughout the several views are denoted by like reference numerals, and repeated description thereof is omitted.

In the following description, the term "aluminum" encompasses aluminum alloys in addition to pure aluminum.

Embodiment 1

Figure 2:
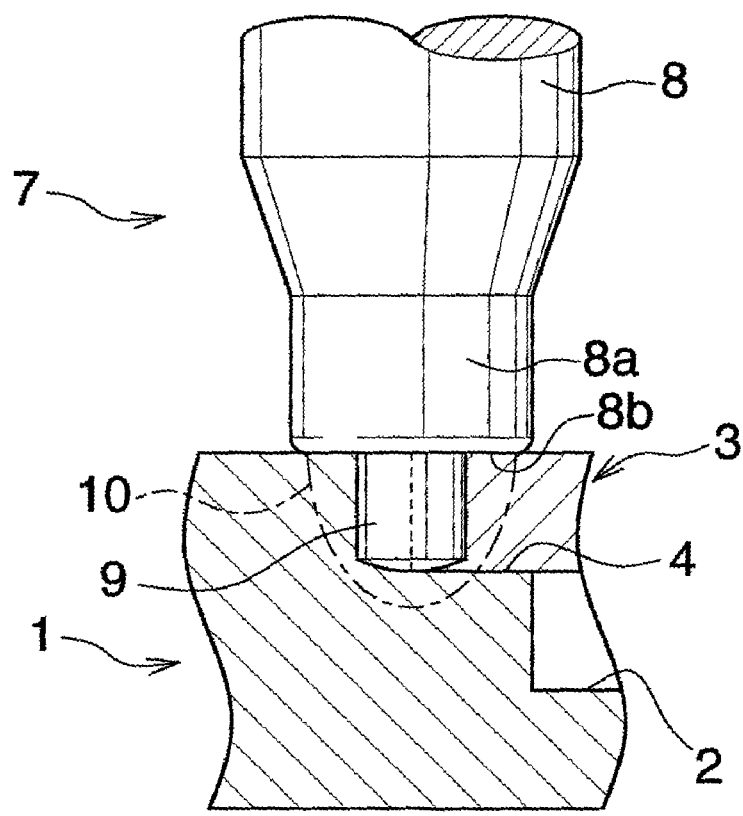
FIG. 2 is a partially enlarged vertical sectional view showing another part of the process in the method of manufacturing a hollow body according to Embodiment 1 of the present invention.
Figure 3:
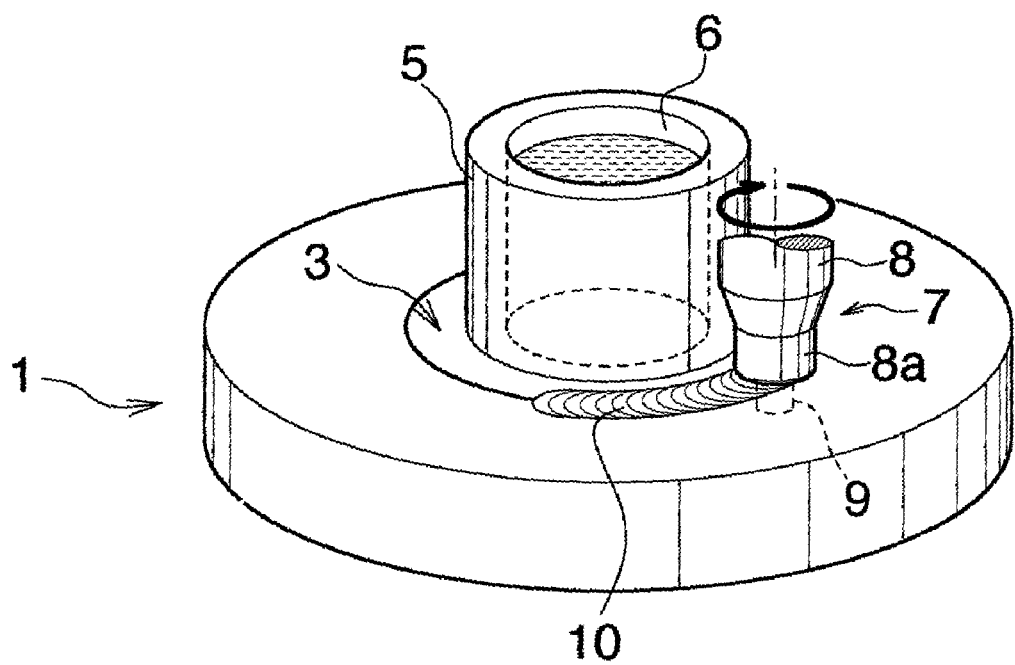
FIG. 3 is a vertical sectional view showing still another part of the process in the method of manufacturing a hollow body according to Embodiment 1 of the present invention.

The present embodiment is shown in FIGS. 1 to 3 and is a method of manufacturing a hollow body which consists of a base having a recess, and a cover fitted into the recess and closing the opening of the recess.

First, there are prepared a base 1 having a recess 2 whose inner peripheral surface is circular, and a disklike cover 3 which is fitted into the recess 2 and adapted to close the opening of the recess 2. A stepped portion 4 for supporting a circumferential portion of the cover 3 is formed on the inner circumferential surface of the recess 2 of the base 1 at a portion located on a side toward a bottom. The thickness of the cover 3 is smaller than the overall depth of the recess 2 and is equal to the depth of a portion of the recess 2 located above the stepped portion 4. The diameter of the cover 3 is equal to or slightly smaller than the inside diameter of the recess 2 as measured above the stepped portion 4. A cylindrical cooling-medium holder portion 5 whose interior serves as a cooling-medium accommodation recess 6 is formed integrally with the upper surface of the cover 3, which is smaller in thermal capacity than the base 1, in such a manner as to be concentric with the cover 3.

Each of the base 1 and the cover 3 is formed from, for example, any one of JIS A2000-family alloys, JIS A5000-family alloys, JIS A6000-family alloys, and JIS A7000-family alloys. The base 1 and the cover 3 may be formed from the same material or from different materials.

Next, the cover 3 is fitted into the recess 2 such that a circumferential portion thereof rests on the stepped portion 4, thereby making the upper surface of a portion of the base 1 around the recess 2 and an upper surface of the cover 3 flush with each other (see FIG. 1). A region where the outer circumferential surface of the cover 3 and a portion, located above the stepped portion 4, of the inner circumferential surface of the recess 2 of the base 1 are in proximity to each other is a circumferential prospective joint region.

A liquid-phase cooling medium, such as water, ethanol, or liquid nitrogen, is placed in the cooling-medium accommodation recess 6 of the holder portion 5 of the cover 3. By use of a friction stir welding jig 7, the base 1 and the cover 3 are friction-stir-welded together. The liquid-phase cooling medium removes latent heat through phase change, thereby cooling the base 1 and the cover 3.

The friction-stir-welding tool 7 includes a columnar rotor 8 and a pin-like probe 9. The columnar rotor 8 has a small-diameter portion 8a which is coaxially and integrally formed at a distal end portion thereof via a taper portion. The probe 9 is coaxially and integrally formed on the end surface of the small-diameter portion 8a of the columnar rotor 8 and has a diameter smaller than that of the small-diameter portion 8a. The rotor 8 and the probe 9 are formed from a material which is harder than the base 1 and the cover 3 and is resistant to frictional heat generated during joining.

While the rotor 8 and the probe 9 of the friction-stir-welding tool 7 are rotated, the probe 9 of the friction-stir-welding tool 7 is plunged from the outside into the prospective joint region at a certain circumferential position so as to be plunged into a peripheral portion of the base 1 around the opening of the recess 2 and into a peripheral portion of the cover 3. Also, a shoulder portion 8b of the tool 7 located between the small-diameter portion 8a and the probe 9 is pressed against the upper surfaces of the base 1 and the cover 3 (see FIG. 2).

Next, during rotation of the rotor 8 and the probe 9, the base 1 and the cover 3, and the friction-stir-welding tool 7 are caused to undergo relative movement so as to move the probe 9 in the circumferential direction along the prospective joint region.

By this procedure, frictional heat generated by rotation of the probe 9 and frictional heat generated by rubbing of the shoulder portion 8b against the base 1 and the cover 3 soften the base metal(s) of the base 1 and the cover 3 in the vicinity of the prospective joint region. The thus-softened metal is stirred and mixed through subjection to the rotative force of the probe 9 and flows plastically in such a manner as to fill a groove that is formed through passage of the probe 9. Subsequently, the softened metal quickly loses frictional heat to thereby be cooled and solidified. This phenomenon repeatedly occurs as the probe 9 moves, whereby joining between the base 1 and the cover 3 progresses. Reference numeral 10 denotes a weld bead (see FIG. 3).

At this time, the liquid-phase cooling medium removes latent heat and vaporizes. Thus, the above-mentioned frictional heat is removed, thereby restraining a significant temperature rise of the base 1 and the cover 3, particularly a significant temperature rise of the cover 3, whose thermal capacity is smaller than that of the base 1.

When the probe 9 moves along the whole circumference of the prospective joint region, a peripheral portion of the base 1 around the opening of the recess 2 and a peripheral portion of the cover 3 are joined together along the whole circumference. After the probe 9 returns to a plunging-in position where the probe 9 was plunged in, preferably, after the probe 9 passes the plunging-in position, the probe 9 is moved straight in a direction tangent to the prospective joint region up to a stopper member (not shown) disposed at the periphery of the base 1. Then, the probe 9 is drawn out. The base 1 and the cover 3 are thus friction-stir-welded together, thereby yielding a hollow body.

Although unillustrated, when friction stir welding is to be performed, the base 1 and the cover 3 are clamped by appropriate clamp members.

Next, a specific Experimental Example of the method of Embodiment 1, together with a Comparative Example, will be described.

Experimental Example

The base 1 and the cover 3 formed from JIS A2014-T6 were prepared. Outside diameter D1 of base 1: 200 mm; thickness T1 of base 1: 30 mm; inside diameter D2 of recess 2 as measured above stepped portion 4 (=diameter of cover 3): 100 mm; thickness T2 of cover 3 (=depth of recess 2 as measured above stepped portion 4): 10 mm; height H of holder portion 5: 50 mm; inside diameter D3 of holder portion 5: 50 mm; and outside diameter D4 of holder portion 5: 70 mm.

The prepared friction-stir-welding tool 7 had the following dimensions. Diameter d1 of shoulder portion 8b as measured at end face of small-diameter portion 8a of rotor 8: 20 mm; diameter d2 of probe 9: 9 mm; and length l of probe 9: 10 mm.

Water of room temperature was placed to a depth of 30 mm in the cooling-medium accommodation recess 6 of the holder portion 5. Friction stir welding was carried out 360 degrees along the prospective joint region, with the probe rotational speed set to 500 rpm and the probe advancing speed set to 20 mm/min. Subsequently, the probe 9 was moved straight by 60 mm in a direction tangent to the joint portion and was then drawn out.

Comparative Example

The base and the cover were friction-stir-welded together in a manner similar to that of the above-mentioned Example except that the cover did not have the holder portion.

Evaluation Test

In the course of the above-mentioned friction stir welding, temperature was measured by use of a thermocouple at two positions located 2 mm deep from the surface and 15 mm inside and outside, respectively, of the prospective joint region at point 1 which was located 5 degrees circumferentially apart from a joining start point in the moving direction of the probe, and at point 2 which was located 355 degrees circumferentially apart from the joining end/start point in the moving direction of the probe. Measured ultimate temperatures are shown in Table 1. As is apparent from Table 1, as compared with the Comparative Example, the Example shows smaller temperature differences between point 1 and point 2 with respect to the temperatures measured at the inside and the outside of the prospective joint region, as well as lower ultimate temperatures at point 1 and point 2 with respect to the temperatures measured at the inside and the outside of the prospective joint region.

TABLE 1

|  | Ultimate temperature | | | |
|---|---|---|---|---|
|  | Point 1 | | Point 2 | |
|  | Inside | Outside | Inside | Outside |
| Example | 244 | 225 | 267 | 245 |
| Comparative Example | 257 | 225 | 292 | 255 |

Inspection of cross sections of the joint portions revealed that the Example was free of defect along the whole circumference of the joint portion, whereas the Comparative Example had a defect at point 2.

Embodiment 2

Figure 4:
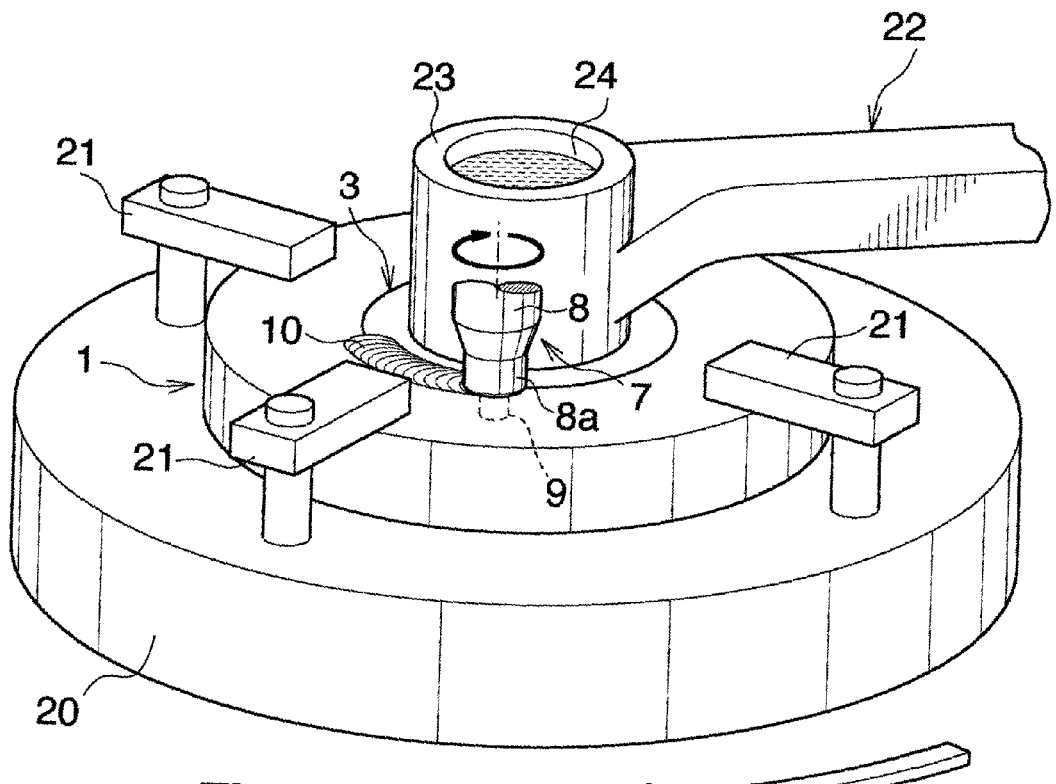
FIG. 4 is a vertical sectional view showing a part of a process in a method of manufacturing a hollow body according to Embodiment 2 of the present invention.

The present embodiment is shown in FIG. 4 and is a method of manufacturing a hollow body which consists of a base having a recess, and a cover fitted into the recess and closing the opening of the recess.

In Embodiment 2, the holder portion 5 is not formed on the upper surface of the cover 3. When friction stir welding is to be performed, the base 1 is placed on a turntable 20, and the base 1 is fixed on the turntable 20 by means of a plurality of base clamp members 21 provided on the turntable 20. Furthermore, the cover 3 is fixed on the base 1 by means of a cover clamp member 22 provided separately from the turntable 20.

The cover clamp member 22 has a holder portion 23, which, in turn, has a closed-bottomed cooling-medium accommodation recess 24. In a state in which a liquid-phase cooling medium is placed in the cooling-medium accommodation recess 24 of the holder portion 23, the base 1 and the cover 3 undergo friction stir welding in a manner similar to that of Embodiment 1.

Other configurational features are similar to those of the method of manufacturing a hollow body of Embodiment 1.

In Embodiment 2, a vertically extending through-hole may be formed in a distal end portion of the cover clamp member 22 for use as the cooling-medium accommodation recess 24. In this case, the liquid-phase cooling medium may leak from the cooling-medium accommodation recess 24. However, since the cooling medium removes latent heat and vaporizes, no problem arises.

Embodiment 3

Figure 5:
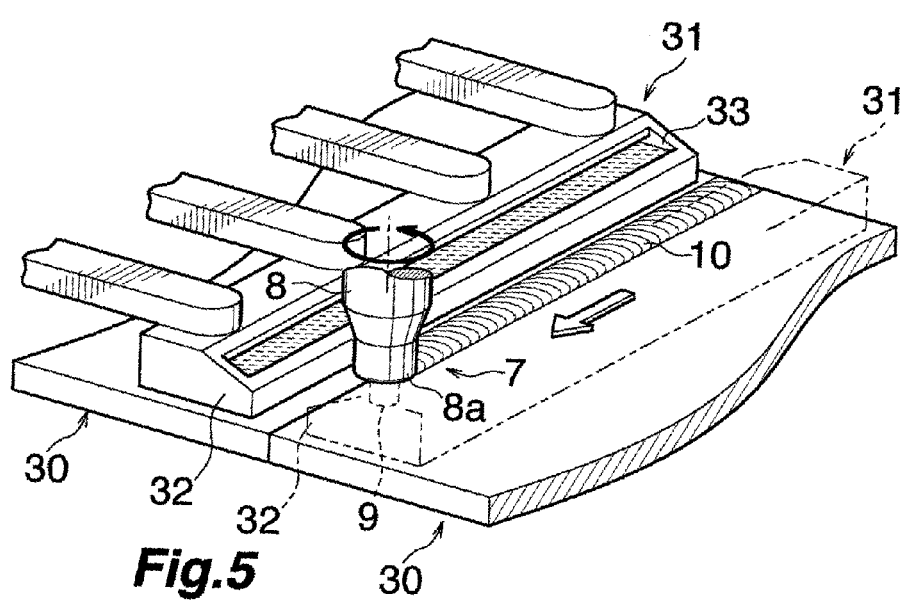
FIG. 5 is a perspective view showing a part of a process in a method of manufacturing a hollow body according to Embodiment 3 of the present invention.

The present embodiment is shown in FIG. 5 and is a method of friction-stir-welding two plate workpieces together.

First, two plate workpieces 30 having the same thickness are prepared. Each of the two workpieces 30 is formed from, for example, any one of JIS A2000-family alloys, JIS A5000-family alloys, JIS A6000-family alloys, and JIS A7000-family alloys. The two workpieces 30 may be formed from the same material or from different materials.

Next, the two workpieces 30 are arranged such that their lateral end portions butt against each other. The two workpieces 30 are fixed, by means of respective clamp members 31, at respective portions in the vicinity of a butting region along substantially the overall length of the butting region. The butting region where lateral end portions of the two workpieces 30 butt against each other is a rectilinear, prospective joint region. Each of the clamp members 31 has a holder portion 32, which, in turn, has a cooling-medium accommodation recess 33.

A liquid-phase cooling medium, such as water, ethanol, or liquid nitrogen, is placed in the cooling-medium accommodation recesses 33 of the holder portion 32 of the clamp members 31.

While the rotor 8 and the probe 9 of the friction-stir-welding tool 7 are rotated, the probe 9 of the friction-stir-welding tool 7 is plunged from above into the prospective joint region, where the lateral end portions of the two workpieces 30 butt against each other, at a longitudinal end portion of the prospective joint region so as to be plunged into the two workpieces 30. Also, the shoulder portion 8b of the tool 7 located between the small-diameter portion 8a and the probe 9 is pressed against the upper surfaces of the two workpieces 30.

Next, while the rotor 8 and the probe 9 are rotated, the two workpieces 30 and the friction-stir-welding tool 7 are caused to undergo relative movement so as to move the probe 9 in the longitudinal direction along the prospective joint region.

By this procedure, frictional heat generated by rotation of the probe 9 and frictional heat generated by rubbing of the shoulder portion 8b against the two workpieces 30 soften the base metal of the two workpieces 30 in the vicinity of the prospective joint region. The thus-softened metal is stirred and mixed through subjection to the rotative force of the probe 9 and flows plastically in such a manner as to fill a groove that is formed through passage of the probe 9. Subsequently, the softened metal quickly loses frictional heat to thereby be cooled and solidified. This phenomenon repeatedly occurs as the probe 9 moves, whereby joining between the two workpieces 30 progresses.

At this time, the liquid-phase cooling medium removes latent heat and vaporizes. Thus, the above-mentioned frictional heat is removed, thereby restraining a significant temperature rise of the two workpieces 30.

When the probe 9 moves along the overall length of the prospective joint region, the lateral end portions of the two workpieces 30 are joined together along the overall length. Then, the probe 9 is moved up to a stopper member (not shown) disposed at a terminal end portion of the prospective joint region of the two workpieces 30. Then, the probe 9 is drawn out. The two workpieces 30 are thus friction-stir-welded together.

In Embodiment 3 described above, each of the clamp members 31 used to fix the respective workpieces 30 has the holder portion 32 having the cooling-medium accommodation recess 33. However, the present invention is not limited thereto. In the case where one of the two workpieces 30 has a high high-temperature deformation resistance or a small thermal capacity, only the clamp member 31 used to fix the workpiece 30 may be provided with the holder portion 32 having the cooling-medium accommodation recess 33. Also, in the case where one of the two workpieces 30 has a high high-temperature deformation resistance or a small thermal capacity, the workpiece may have an integrally formed holder portion having a cooling-medium accommodation recess.

The above-described three embodiments use a liquid-phase cooling medium. Instead of the liquid-phase cooling medium, a solid-phase cooling medium, ice or dry ice, may be used.

In the above-described three embodiments, the amount of a cooling medium to be used is determined experimentally. Specifically, the amount of a cooling medium is determined experimentally such that the cooling medium remains even at the time of completion of friction stir welding.

INDUSTRIAL APPLICABILITY

The method of manufacturing a hollow body according to the present invention is applied to manufacture of hollow bodies utilized in various industries.

The invention claimed is:

1. A friction stir welding method, comprising:
providing two workpieces of metal, a friction-stir-welding tool having a probe, and two clamp members for clamping the workpiece, at least one of said clamp members having a holder portion with a cooling-medium accommodation recess opening upward thereby exposing the cooling-medium to an outer environment;
clamping said workpieces at a prospective joint region;
plunging said probe of a friction-stir-welding tool into the prospective joint region of said two workpieces of metal from above; and
rotating the probe, such that the probe and the two workpieces are caused to undergo relative movement, thereby moving the probe along the prospective joint region of the two workpieces and friction-stir-welding the two workpieces together, such that a cooling medium for removing latent heat during friction stir welding is held on said holder portion of at least one of the clamp members for clamping the workpiece from above.

2. A friction stir welding method according to claim 1, wherein the two workpieces differ in thermal capacity, and the cooling medium accommodation recess opening upward is positioned on the clamp member for clamping the workpiece with smaller thermal capacity from above.

3. A friction stir welding method according to claim 1, wherein the two workpieces differ in high-temperature deformation resistance, and the cooling medium accommodation recess opening upward is positioned on the clamp member for clamping the workpiece with higher high-temperature deformation resistance from above.

* * * * *

UNITED STATES PATENT AND TRADEMARK OFFICE
CERTIFICATE OF CORRECTION

| | | |
|---|---|---|
| PATENT NO. | : 7,721,938 B2 | Page 1 of 1 |
| APPLICATION NO. | : 12/063243 | |
| DATED | : May 25, 2010 | |
| INVENTOR(S) | : Nagano | |

It is certified that error appears in the above-identified patent and that said Letters Patent is hereby corrected as shown below:

On the title page, Item (54) and in column 1, the title is incorrect. Item (54) and the top of column 1 should read:

Item -- (54)　　FRICTION STIR WELDING METHOD AND METHOD OF MANUFACTURING HOLLOW BODY --

Signed and Sealed this

Tenth Day of August, 2010

David J. Kappos
*Director of the United States Patent and Trademark Office*